United States Patent
Bäckman et al.

(10) Patent No.: US 9,692,315 B2
(45) Date of Patent: Jun. 27, 2017

(54) HIGH EFFICIENCY AC-AC CONVERTER WITH BIDIRECTIONAL SWITCH

(71) Applicant: Eltek AS, Drammen (NO)

(72) Inventors: Nils Bäckman, Stockholm (SE); Roberto Rojas, Solna (SE)

(73) Assignee: Eltek AS, Drammen (NO)

( * ) Notice: Subject to any disclaimer, the term of this patent is extended or adjusted under 35 U.S.C. 154(b) by 42 days.

(21) Appl. No.: 14/762,708

(22) PCT Filed: Jan. 7, 2014

(86) PCT No.: PCT/EP2014/050129
§ 371 (c)(1),
(2) Date: Jul. 22, 2015

(87) PCT Pub. No.: WO2014/114481
PCT Pub. Date: Jul. 31, 2014

(65) Prior Publication Data
US 2015/0381070 A1    Dec. 31, 2015

Related U.S. Application Data

(60) Provisional application No. 61/755,791, filed on Jan. 23, 2013.

(30) Foreign Application Priority Data

Jan. 23, 2013    (GB) .................................. 1301189.5

(51) Int. Cl.
*H02M 5/458* (2006.01)
*H02J 9/06* (2006.01)
*H02M 7/217* (2006.01)

(52) U.S. Cl.
CPC ........... *H02M 5/4585* (2013.01); *H02J 9/062* (2013.01); *H02M 7/217* (2013.01)

(58) Field of Classification Search
CPC .......................... H02M 5/458; H02M 5/4585
(Continued)

(56) References Cited

U.S. PATENT DOCUMENTS

2006/0072353 A1    4/2006    Mhaskar et al.
2008/0013351 A1*   1/2008    Alexander .......... H02M 3/1582
                                                              363/123
(Continued)

FOREIGN PATENT DOCUMENTS

EP    1 450 476 A2    8/2004
WO    2012/067167 A1    5/2012

OTHER PUBLICATIONS

International Search Report issued in PCT/EP2014/050129 mailed on May 14, 2014 (2 pages).
(Continued)

*Primary Examiner* — Jeffrey Sterrett
(74) *Attorney, Agent, or Firm* — Osha Liang LLP (57) ABSTRACT

An AC-AC converter device includes first and second AC input terminals and first and second AC output terminals. An input device is connected between an input node, a common node, a positive DC terminal and a negative DC terminal, wherein the input node is connected to the first AC input terminal via a first input inductor. An output device is connected between an output node, the positive DC terminal and the negative DC terminal, wherein the output node is connected to the first AC output terminal via an output inductor. A common device is connected between the common node, the positive DC terminal and the negative DC terminal, where the common node is connected to the second AC input terminal via a common inductor. A control device is provided for controlling the switches of the output device and the common device.

11 Claims, 12 Drawing Sheets

(58) Field of Classification Search
USPC .................................................. 363/34, 37
See application file for complete search history.

(56) References Cited

U.S. PATENT DOCUMENTS

| | | | | |
|---|---|---|---|---|
| 2012/0063178 A1* | 3/2012 | Fujita | ................. | H02M 5/4585 363/37 |
| 2012/0307531 A1* | 12/2012 | Toliyat | ................ | H02M 5/4585 363/36 |
| 2013/0235625 A1* | 9/2013 | Yamada | .............. | H02M 5/4585 363/37 |
| 2013/0301314 A1* | 11/2013 | Fu | ........................ | H02M 7/487 363/37 |
| 2015/0381070 A1* | 12/2015 | Backman | ............ | H02M 5/4585 363/37 |

OTHER PUBLICATIONS

Written Opinion of the International Searching Authority issued in PCT/EP2014/050129 mailed on May 14, 2014 (6 pages).

International Preliminary Report on Patentability from PCT/EP2014/050129 issued on May 6, 2015 (16 pages).

Combined Search and Examination Report for corresponding United Kingdom Application No. GB1301189.5, mailed Jun. 20, 2013 (7 pages).

H. Pinheiro et al.; "Space Vector Modulation Method for Single Phase On-Line Three-Leg UPS"; 0-7803-6407, 2000 IEEE; pp. 679-686; Apr. 2000 (8 pages).

T. Uematsu et al.; "A Study of the High Performance Single Phase UPS"; 0-7803-4489, 1998 IEEE; pp. 1872-1878; Aug. 1998 (7 pages).

\* cited by examiner

HIGH EFFICIENCY AC-AC CONVERTER WITH BIDIRECTIONAL SWITCH

CROSS-REFERENCE TO RELATED APPLICATIONS

This application is a national stage application of PCT/EP2014/050129 filed Jan. 7, 2014, which claims priority to U.K. Application No. 1301189.5 filed on Jan. 23, 2013 and which claims priority to U.S. Provisional Application No. 61/755,791 filed on Jan. 23, 2013, the entire contents of which are hereby incorporated by reference.

BACKGROUND

One or more embodiments of the present invention relate to an AC-AC converter device.

AC-DC-AC converters are used for line conditioning by converting an AC input power, for example the mains, to a controlled AC output power supplied to a load. The load is typically a load requiring a reliable AC voltage and a reliable frequency, such as IT equipment for critical mission applications. The DC voltage can be provided from a battery or any other type of energy storage. The DC voltage can also originate from a solar panel or a wind generator provided with a suitable energy conversion module. AC-input could be the utility AC-line voltage and the output could be any AC-load.

Figure 1:
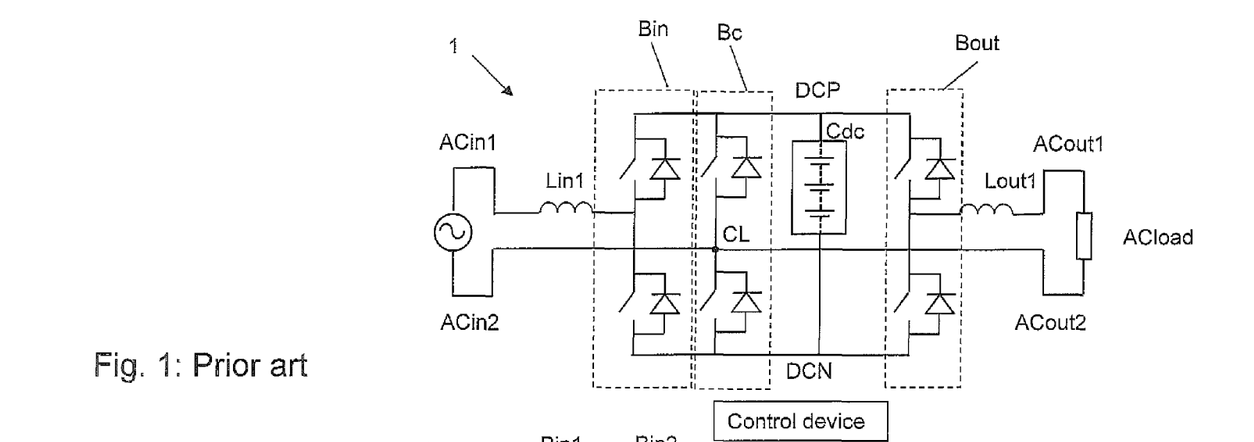
FIGS. 1-5 illustrate prior art AC-AC converter devices.

An AC-AC converter typically consists of an AC-DC converter and a DC-AC converter. These two converters are linked together by a DC voltage which is filtered and kept constant over the line period by a large amount of capacitance or any given energy storage device. The DC-voltage is required to be larger than the maximum peak value of the positive and negative half cycle of the line voltage. In an UPS application, it is probably required that the neutral line is common for the load and the line voltage and the load voltage to be in phase with line voltage. One example is shown in "Space vector Modulation for Single Phase On-Line Three-Leg UPS", Pinheiro et al, 2000 IEEE. One popular technique to achieve this is to have a pair of line frequency commutated switches connected in a half bridge configuration connecting either the negative branch of the intermediate DC-voltage to the neutral during positive half-period of the line voltage, and connect the positive branch of the intermediate DC-voltage to the neutral during negative half-period of the line voltage. The input AC/DC converter acts like a boost regulator, stepping the line input AC voltage to a higher DC-voltage, while controlling the input current to be sinusoidal and the DC voltage to be constant. The output DC/AC converter acts like a step-down regulator, controlling the output AC voltage to be sinusoidal and in phase with the input voltage. A typical three leg single phase UPS configuration is shown in FIG. 1. The legs are indicated by dashed boxes Bin, Bout, Bc.

However there is a considerable drawback with this type of circuit since the center leg CL of the center half bridge Bc is common for the in/out rectifier stage (box Bin) and the output inverter stage (box Bout). The timing for controlling the switches connected to the center leg needs to be performed with extreme high precision because no phase shift between line and load voltage can be tolerated.

Figure 2:
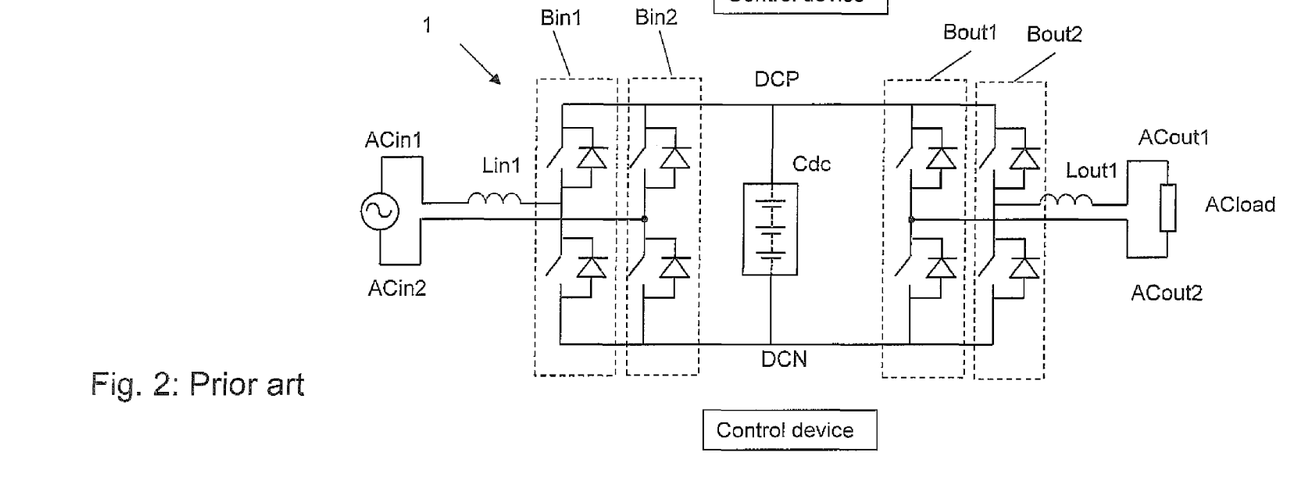

The prior art AC-AC converter device shown in FIG. 2 is known from "A study of the High Performance Single Phase UPS", Tamotsu Ninomiya et al, 0-7803-4489-8/98 IEEE.

FIG. 2 shows a four leg converter with the input stage (boxes Bin1, Bin g) and output stage (boxes Bout1, Bout2) completely decoupled.

Figure 3:
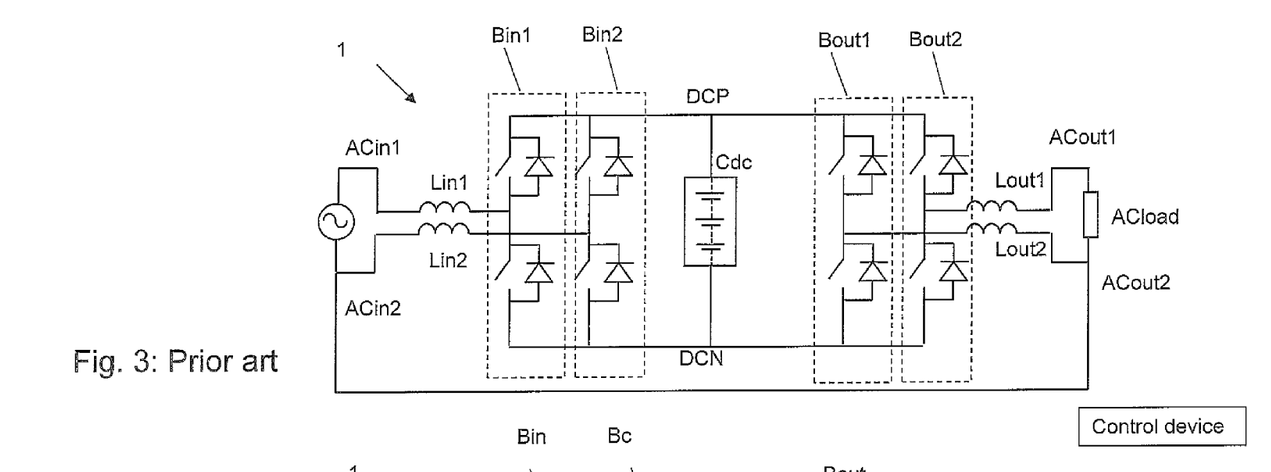

FIG. 3 shows a four leg AC-DC-AC converter with line and load neutral connected, i.e. the second AC input terminal ACin2 is connected to the second AC output terminal ACout2. This circuit is rather complex, having 4 legs and 4 inductors.

Figure 4:
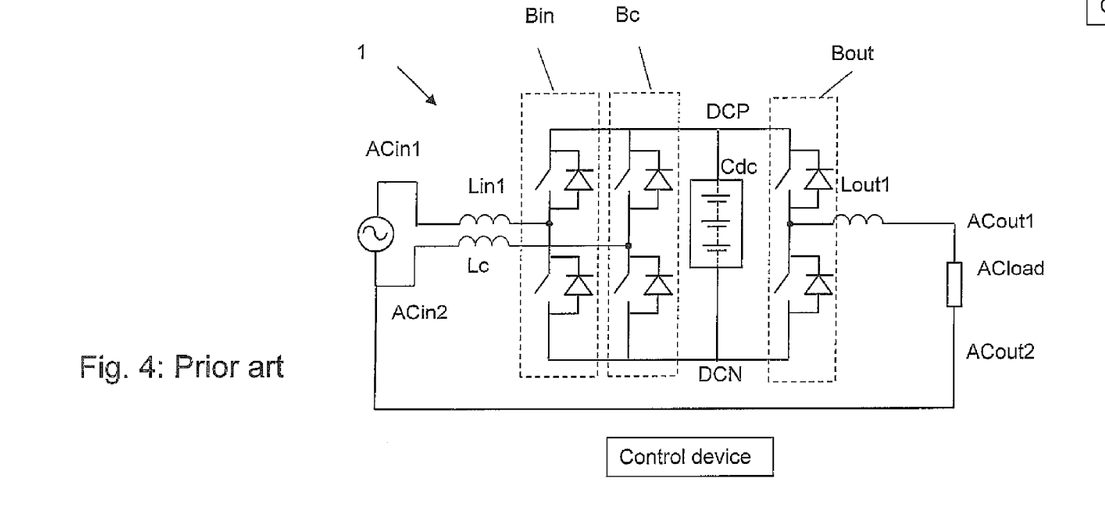

FIG. 4 shows a circuit where the four legs of FIG. 3 has been reduced to 3 legs and 3 inductors and which maintains the ability of independent control of AC output with respect to AC input with some restrictions. As for FIG. 1, one half bridge leg Bc is common for the input/output stage. Here, one half bridge Bin is connected to the first AC input terminal ACin1 via an input inductor Lin1, another half bridge Bout is connected to the first AC output terminal ACout1 via an output inductor Lout1, while the common half bridge Bc is connected to the second AC input terminal ACin2 via a common inductor Lc. As shown in FIG. 4, the second AC input terminal ACin2 is directly connected to the second AC output terminal ACout2, and hence, the common half bridge Bc is considered also to be connected to the second AC input terminal ACin2 via the common inductor Lc. The switches need to be able to block positive voltage and conduct negative current. MOSFETs are therefore suitable having the desired properties, since there is a parasitic body-drain diode capable of conducting current in the negative direction, see FIG. 5.

A disadvantage of having a combination of two MOSFET switches in a half-bridge configuration switching with high frequency is the excessive switching losses coming from the recovery of the slow body-drain diodes. To overcome this problem and allow for high frequency switching, and get all the benefits from high frequency switching in combination with high efficiency one has to prevent the body drain diodes to conduct and allow the current to flow (free-wheel) in another branch.

One object of the present invention is to provide an AC-AC converter device which is achieving high efficiency and still keep the advantage of having a circuit that allows for a phase shift between line input and load output voltage. Another object of the invention is to provide an AC-AC converter device with reduced losses and thus higher efficiency.

SUMMARY OF THE INVENTION

One or more embodiments of the invention relates to a AC-AC converter device, including:
first and second AC input terminals;
first and second AC output terminals;
an input device connected between an input node, a common node, a positive DC terminal and a negative DC terminal, where the input node is connected to the first AC input terminal via a first input inductor,
an output device connected between an output node, the positive DC terminal and the negative DC terminal, where the output node is connected to the first AC output terminal via an output inductor;
a common device connected between the common node, the positive DC terminal and the negative DC terminal, where the common node is connected to the second AC input terminal via a common inductor;
a control device for controlling the switches of the output device and the common device;
a DC device is connected between the positive DC terminal and the negative DC terminal;

where the output device includes first and second output switches;

where the common device includes first and second common switches;

where the second AC input terminal is connected to the second AC output terminal;

where the input device includes first and second diodes and a bi-directional switch connected between the input node and the common node, where the control device is also controlling the bi-directional switch.

In one aspect, the first diode is connected with its anode to the input node and its cathode to the positive DC terminal, the second diode is connected with its anode to the negative DC terminal and its cathode to the input node.

In one aspect, the bidirectional switch includes a first BS switch and switch diodes (DBS1, DBS2, DBS3, DBS4). Here, a drain terminal of the first BS switch is connected to an anode of a first switch diode and to an anode of a second switch diode; a source terminal of the first BS switch is connected to a cathode of a third switch diode and to a cathode of a fourth switch diode; a cathode of the first switch diode and an anode of the third switch diode is connected to the first node; a cathode of the second switch diode and an anode of the fourth switch diode is connected to the second node; a control terminal of the first BS switch is connected to the control circuit.

In one aspect, the bidirectional switch includes a first BS switch and a second BS switch, each including control terminals connected to the control circuit.

In one aspect, a drain terminal of the first BS switch is connected to the first node, a drain terminal of the second BS switch is connected to the third node, a source terminal of the first BS switch is connected to a source terminal of the second BS switch.

In one aspect, a source terminal of the first BS switch is connected to the first node, a source terminal of the second BS switch is connected to the third node, a drain terminal of the first BS switch is connected to a drain terminal of the second BS switch.

In one aspect, the DC device is a capacitor or a battery. In addition, the DC device may comprise an additional DC source.

In one aspect, the common switches are MOSFETs or IGBTs with an antiparallel diode. In one aspect, the first BS switch of the bidirectional switch is a MOSFET or IGBT. In one aspect, the first and second BS switches of the bidirectional switch are MOSFETs.

BRIEF DESCRIPTION OF THE DRAWINGS

FIGS. 10*a*)-10*e*) illustrate waveforms from the simulation;

DETAILED DESCRIPTION

One or more embodiments of the invention will now be described in detail with reference to the enclosed drawings.

Figure 6:
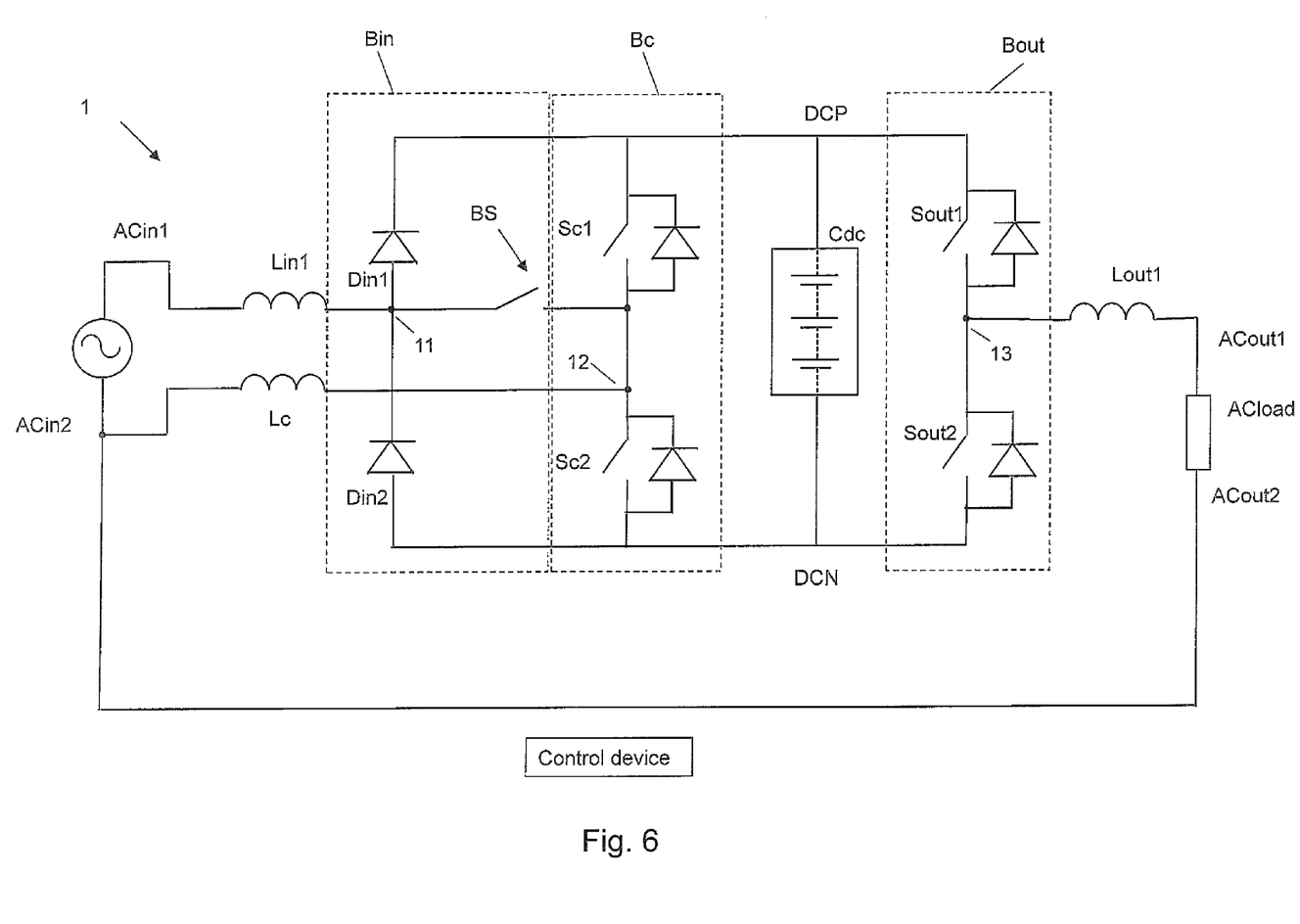
FIG. 6 illustrates a first embodiment of the AC-AC converter device.

It is now referred to FIG. 6, illustrating an AC-AC converter device 1. The AC-AC converter device 1 includes first and second AC input terminals ACin1, ACin2 and first and second AC output terminals ACout1, ACout2.

In FIG. 6, there are three dashed boxes, indicating an input device Bin, an output device Bout and a common device Bc.

The input device Bin is connected between an input node 11, a common node 12, a positive DC terminal DCP and a negative DC terminal DCN. The input node 11 is connected to the first AC input terminal ACin1 via a first input inductor Lin1.

First, the output device Bout and the common device Bc will be described in detail.

Figure 7:
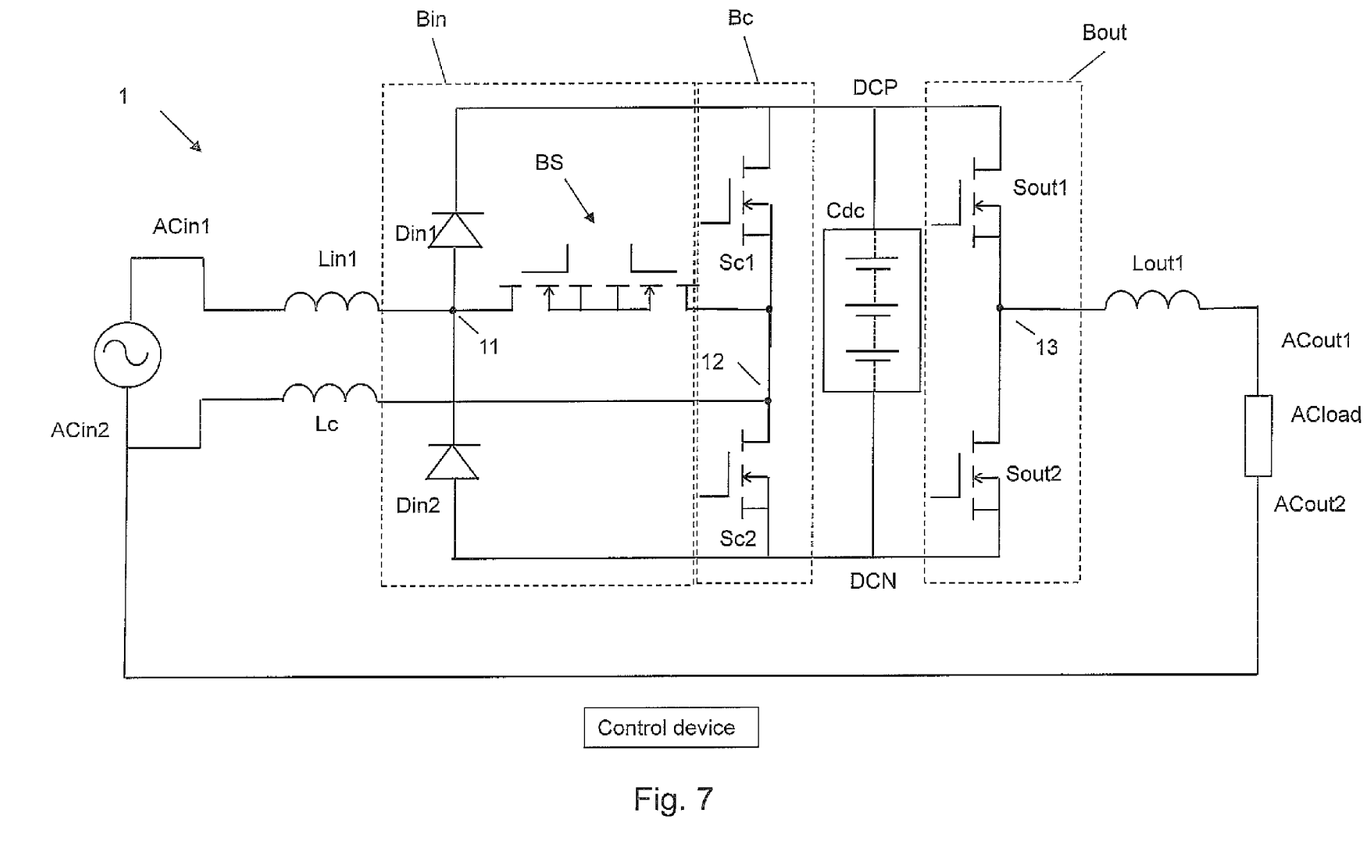
FIG. 7 illustrates a second embodiment of the AC-AC converter device.

The output device Bout is connected between an output node 13, the positive DC terminal DCP and the negative DC terminal DCN. The output node 13 is connected to the first AC output terminal ACout1 via an output inductor Lout1. The output device Bout includes first and second output switches Sout1, Sout2. The first output switch Sout1 is connected between the output node 13 and the positive DC terminal DCP and the second output switch Sout2 is connected between the negative DC terminal DCN and the output node 13. In FIG. 7, the source terminal of the first output switch Sout1 is connected to the output node 13, and the drain terminal of the first output switch Sout1 is connected to the positive DC terminal DCP. Moreover, the source terminal of the second output switch Sout2 is connected to the negative DC terminal DCN and the drain terminal of the second output switch Sout2 is connected to the output node 13.

The common device Bc is connected between the common node 12, the positive DC terminal DCP and the negative DC terminal DCN. The common node 12 is connected to the second AC input terminal ACin2 via a common inductor Lc.

It should be noted that the second AC input terminal ACin2 is connected directly to the second AC output terminal ACout2. Hence, the common node 12 is also connected to the second AC output terminal ACout2 via the common inductor Lc, thereby causing the components inside the box Bc to be "common" for both the input and the output side of the device 1.

The common device Bc includes first and second common switches Sc1, Sc2. The first common switch Sc1 is connected between the common node 12 and the positive DC terminal DCP and the second common switch Sc2 is connected between the negative DC terminal DCN and the common node 12.

In FIG. 7, the source terminal of the first common switch Sc1 is connected to the common node 12, and the drain terminal of the first common switch Sc1 is connected to the positive DC terminal DCP. Moreover, the source terminal of the second common switch Sc2 is connected to the negative DC terminal DCN and the drain terminal of the second common switch Sc2 is connected to the common node 12.

In the following, the input device Bin will be described in detail. The input device Bin includes first and second diodes Din1, Din1 and a bi-directional switch BS. The bi-directional switch BS is connected between the input node 11 and the common node 12. The first diode Din1 is connected with its anode to the input node 11 and its cathode to the positive DC terminal DCP. The second diode Din2 is connected with its anode to the negative DC terminal DCN and its cathode to the input node 11. Preferably, the first and second diodes Din1, Din2 are fast recovery diodes, such as silicon carbide diodes.

The device 1 further includes a control device for controlling the switches of the output device Bout and the common device Bc. Hence, the gate terminals of the first and second output switches Sout1, Sout2 are connected to the control device and the gate terminals of the first and second common switches Sc1, Sc2 are connected to the control device. The control device is also controlling the bi-directional switch BS.

The device 1 further includes a DC device Cdc is connected between the positive DC terminal DCP and the negative DC terminal DCN. The DC device Cdc may be a capacitor or a battery. The DC device may also comprise an additional DC source.

Alternatives of the bidirectional switch BS will now be described. In the first embodiment shown in FIG. 7 and in FIG. 8a, the bidirectional switch BS includes a first BS switch S1 and a second BS switch S2, each including control terminals GS1, GS2 connected to the control circuit. A drain terminal DS1 of the first BS switch S1 is connected to the first node 11, a drain terminal DS2 of the second BS switch S2 is connected to the third node 22, and a source terminal SS1 of the first BS switch S1 is connected to a source terminal SS2 of the second BS switch S2.

Figure 8A:
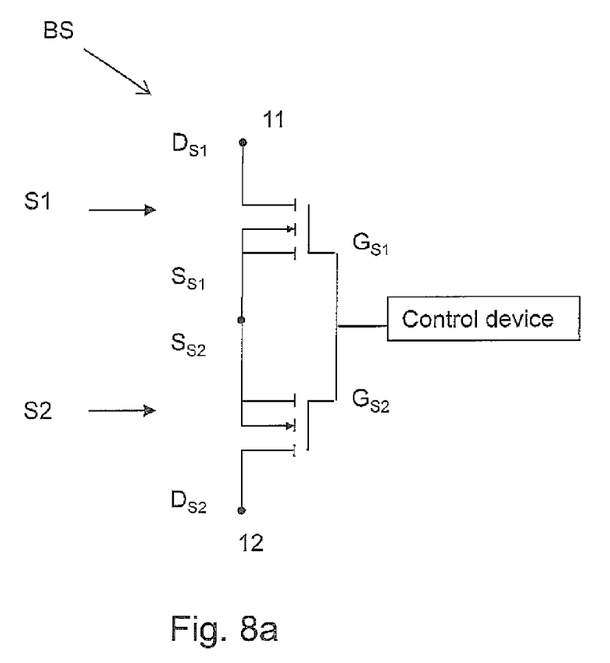
FIGS. 8*a* illustrates an enlarged view of the bidirectional switch of FIG. 2*b*.
Figure 8B:
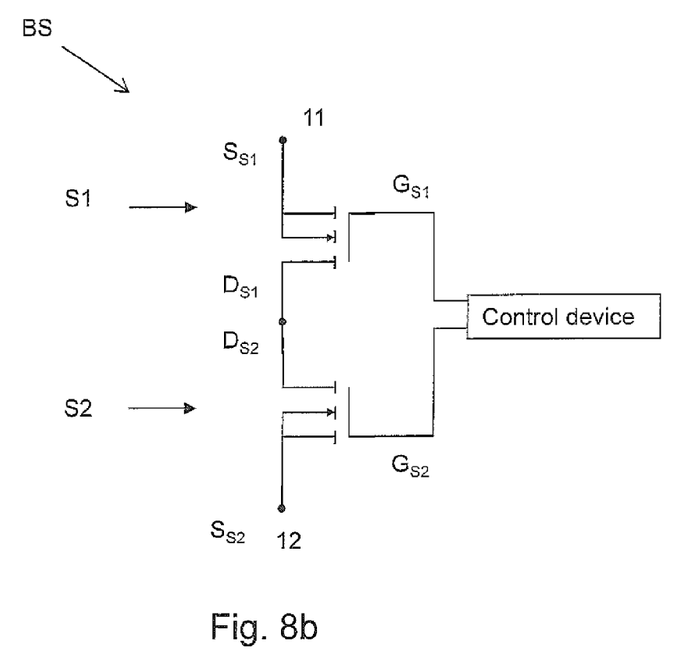
FIG. 8*b* illustrates an enlarged view of an alternative embodiment of the bidirectional switch.

In a second embodiment shown in FIG. 8b, the bidirectional switch BS also includes a first BS switch S1 and a second BS switch S2. Here, a source terminal SS1 of the first BS switch S1 is connected to the first node 11, a source terminal SS2 of the second BS switch S2 is connected to the third node 22, and a drain terminal DS1 of the first BS switch S1 is connected to a drain terminal DS2 of the second BS switch S2.

Figure 8C:
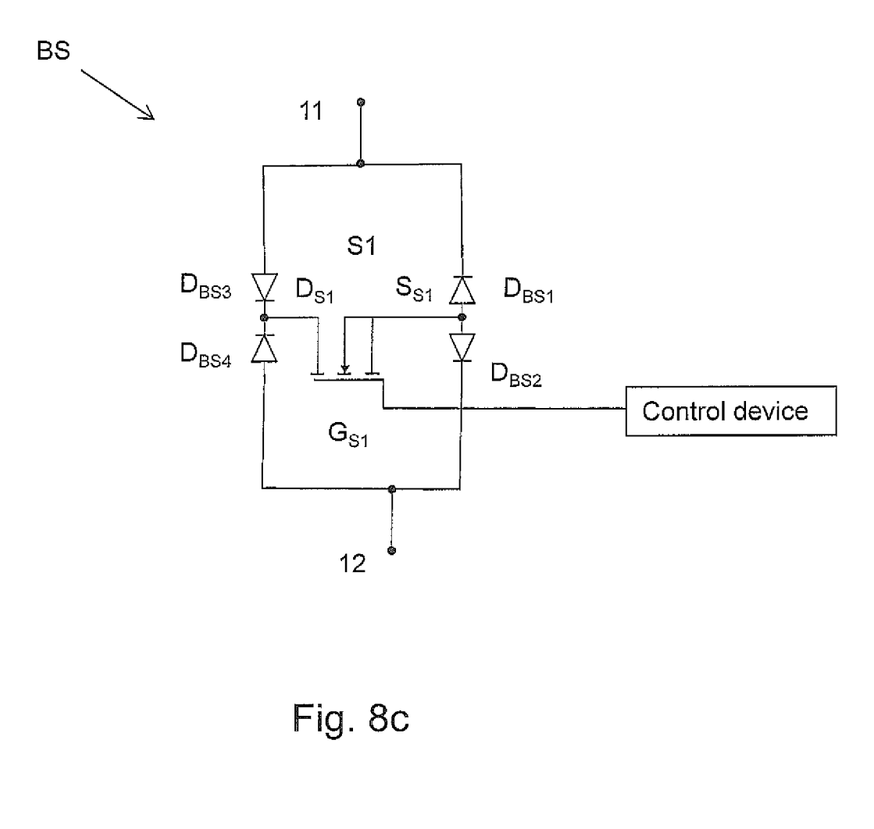
FIG. 8*c* illustrates an enlarged view of yet an alternative embodiment of the bidirectional switches.

In a third embodiment shown in FIG. 8c, the bidirectional switch BS includes a first BS switch S1 and switch diodes DBS1, DBS2, DBS3, DBS4. Here, a drain terminal DS1 of the first BS switch S1 is connected to an anode of a first switch diode DBS1 and to an anode of a second switch diode DBS2. A source terminal SS1 of the first BS switch S1 is connected to a cathode of a third switch diode DBS3 and to a cathode of a fourth switch diode DBS4. A cathode of the first switch diode DBS1 and an anode of the third switch diode DBS3 is connected to the first node 11. A cathode of the second switch diode DBS2 and an anode of the fourth switch diode DBS4 is connected to the second node 22. A control terminal GS1 of the first BS switch S1 is connected to the control circuit.

Figure 12:
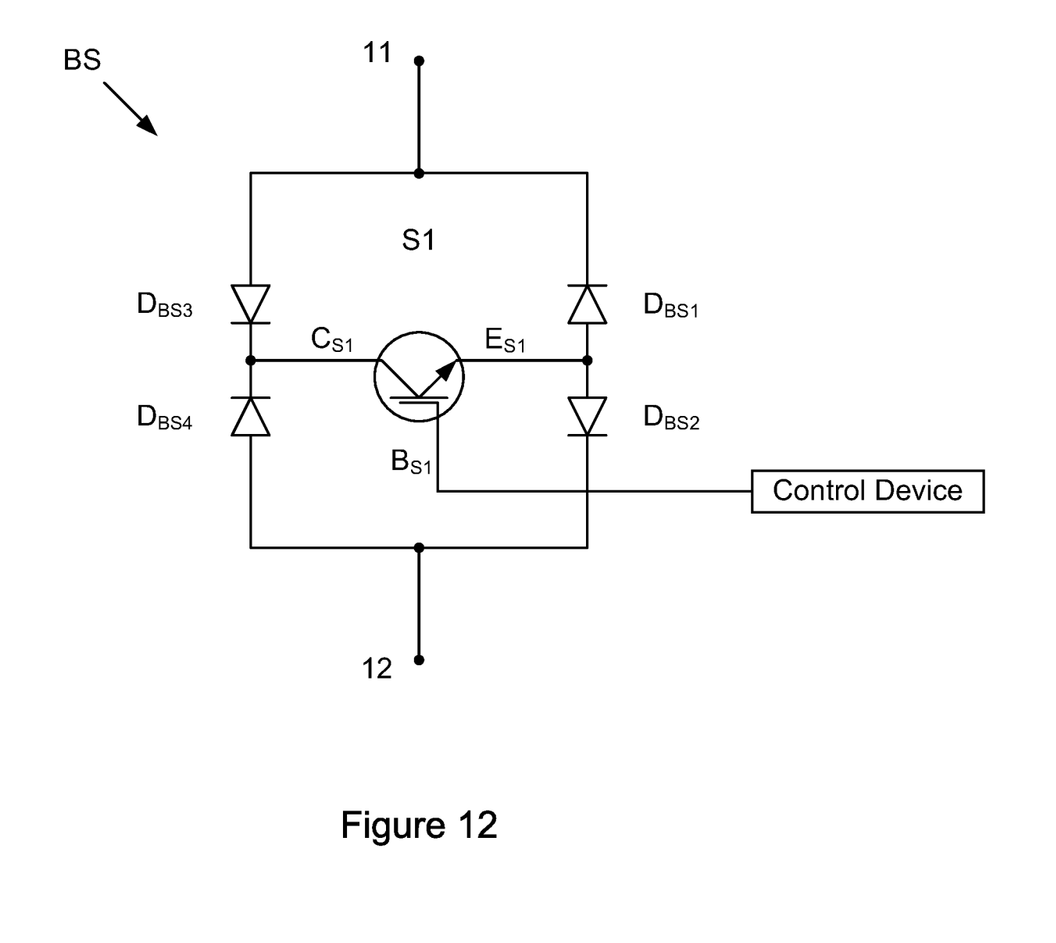
FIG. 12 illustrates an enlarged view of another alternative embodiment of the bidirectional switch.
Figure 13:
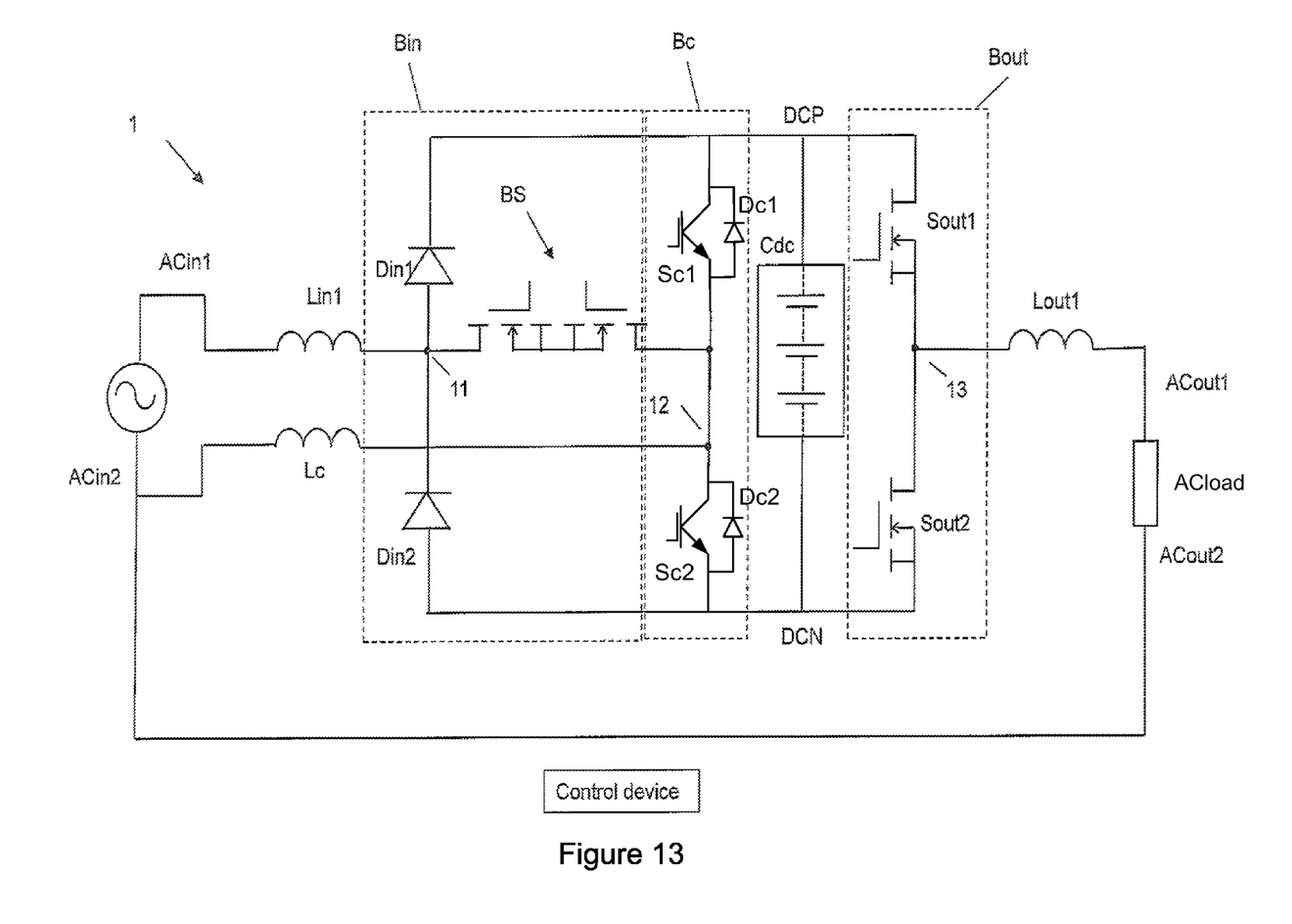
FIG. 13 shows an alternative embodiment of the AC-AC converter device.

In the description above, the common switches Sc1, Sc2 and the output switches Sout1, Sout2 are MOSFET switches or IGBT switches with an antiparallel diode, as for example shown in FIGS. 7 and 13, respectively. In FIG. 13, the antiparallel diodes are labeled Dc1 and Dc2. Preferably, the switches are silicon carbide MOSFETs or gallium nitride MOSFETs. Also, the first BS switch S1 of the bidirectional switch BS is a MOSFET or IGBT, as for example illustrated in FIGS. 8c and 12, respectively. In FIG. 12, $B_{S1}$ refers to the base, $C_{S1}$ refers to the collector, and $E_{S1}$ refers to the emitter of the IGBT. In FIGS. 8a and 8b, also the first and second BS switches S1, S2 of the bidirectional switch BS are MOSFET switches.

Figure 5:
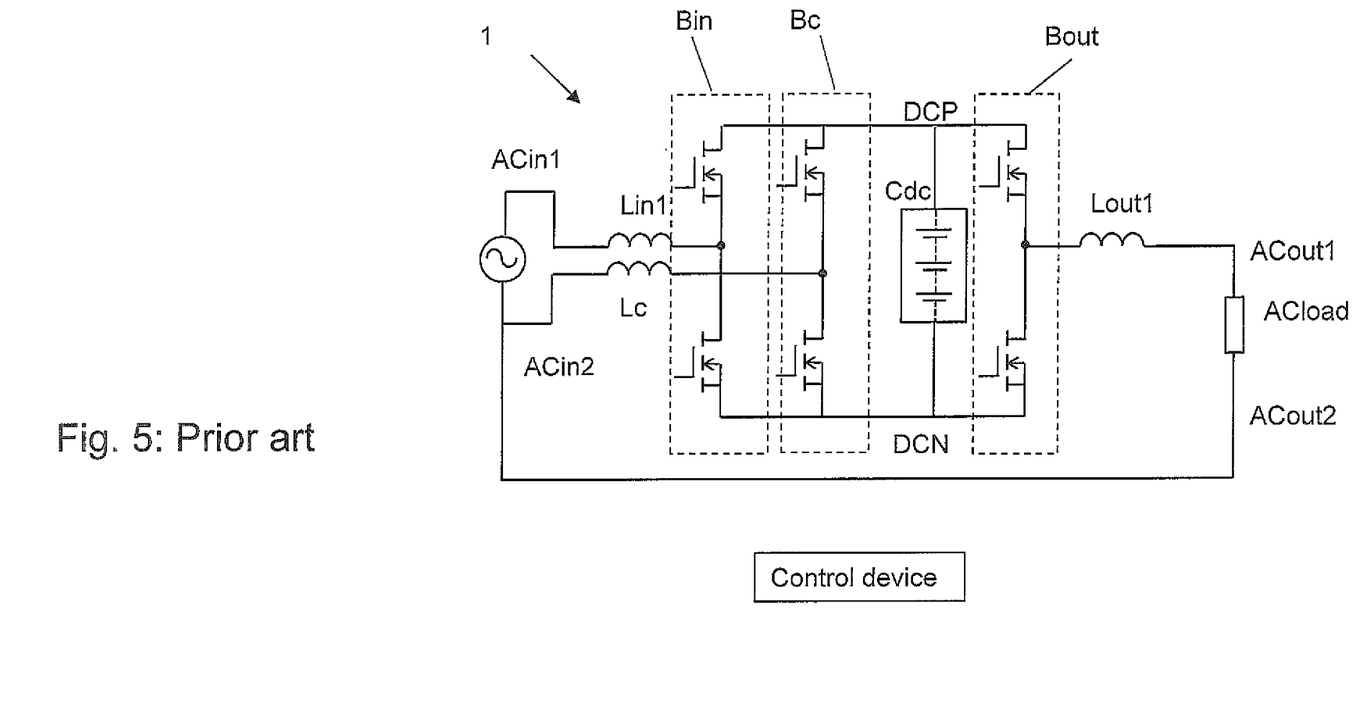

The AC/AC converter device of FIG. 6 and FIG. 7 shows that it is possible to replace one of the three half-bridge legs of the converter device in FIG. 5 with a bidirectional switch and two diodes. Since the input boost converter Bin utilizes the discrete diodes D1 and D2 for freewheeling the current when the bidirectional switch BS is turned off, the internal body drain diode in the MOSFETs are not in use and thus the problem with reverse recovery losses in the slow body drain diodes is eliminated. Instead it is now possible to use fast recovery diodes or silicon carbide diodes, i.e. the first and second diodes D1 and D2 which exhibit very low reverse recovery losses, if any at all. Therefore it is possible to raise the switching frequency of the input boost converter Bin without suffering from drastically reduced efficiency. Hence, an efficient converter device is achieved, while at the same time all the advantages that come with higher switching frequency, such as smaller filter components, less ripple in the input inductor L1 etc are also achieved.

Figure 9:
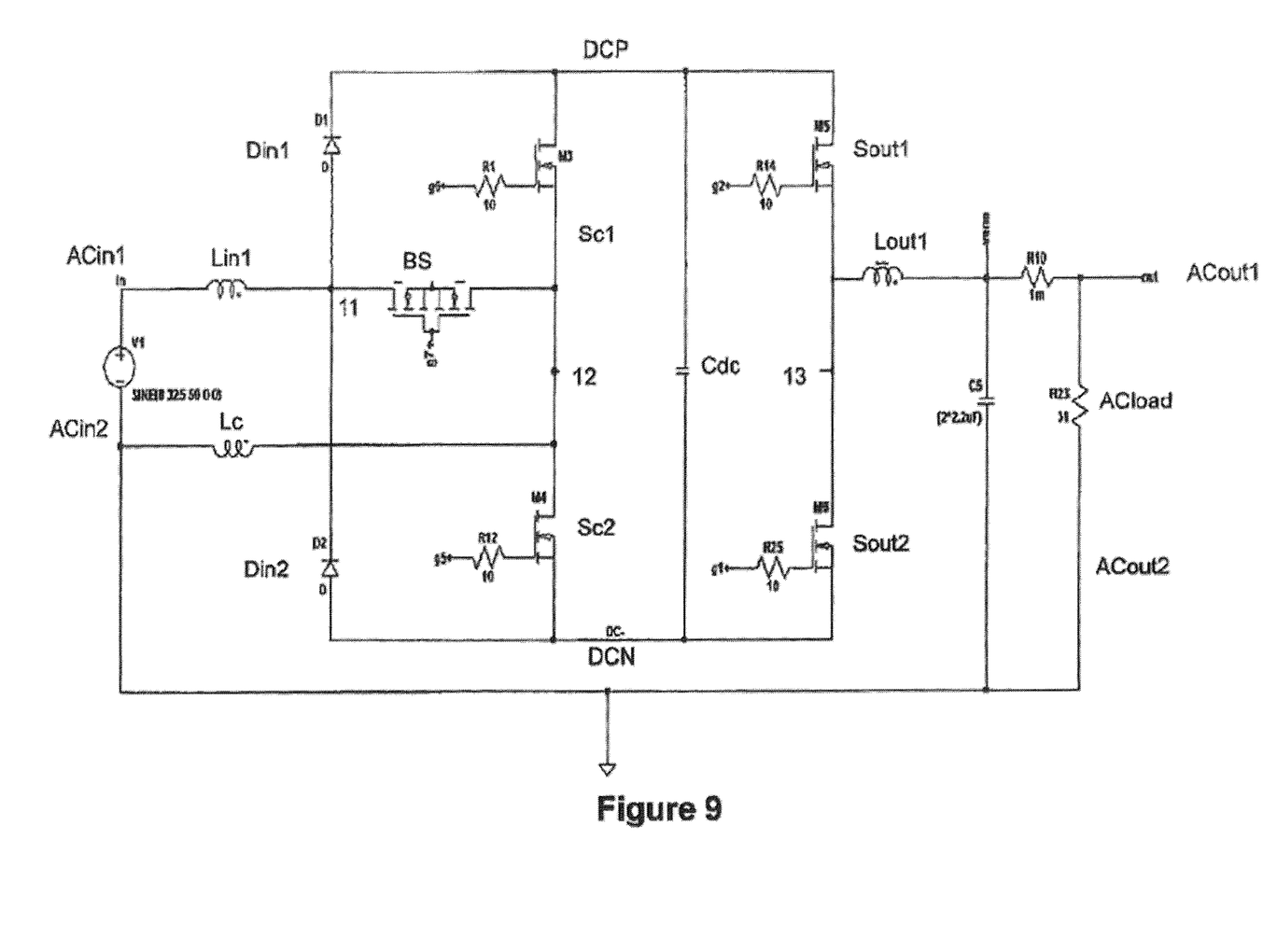
FIG. 9 shows the simulation model used in PSPICE for simulation of the circuit of FIG. 7.
Figure 10:
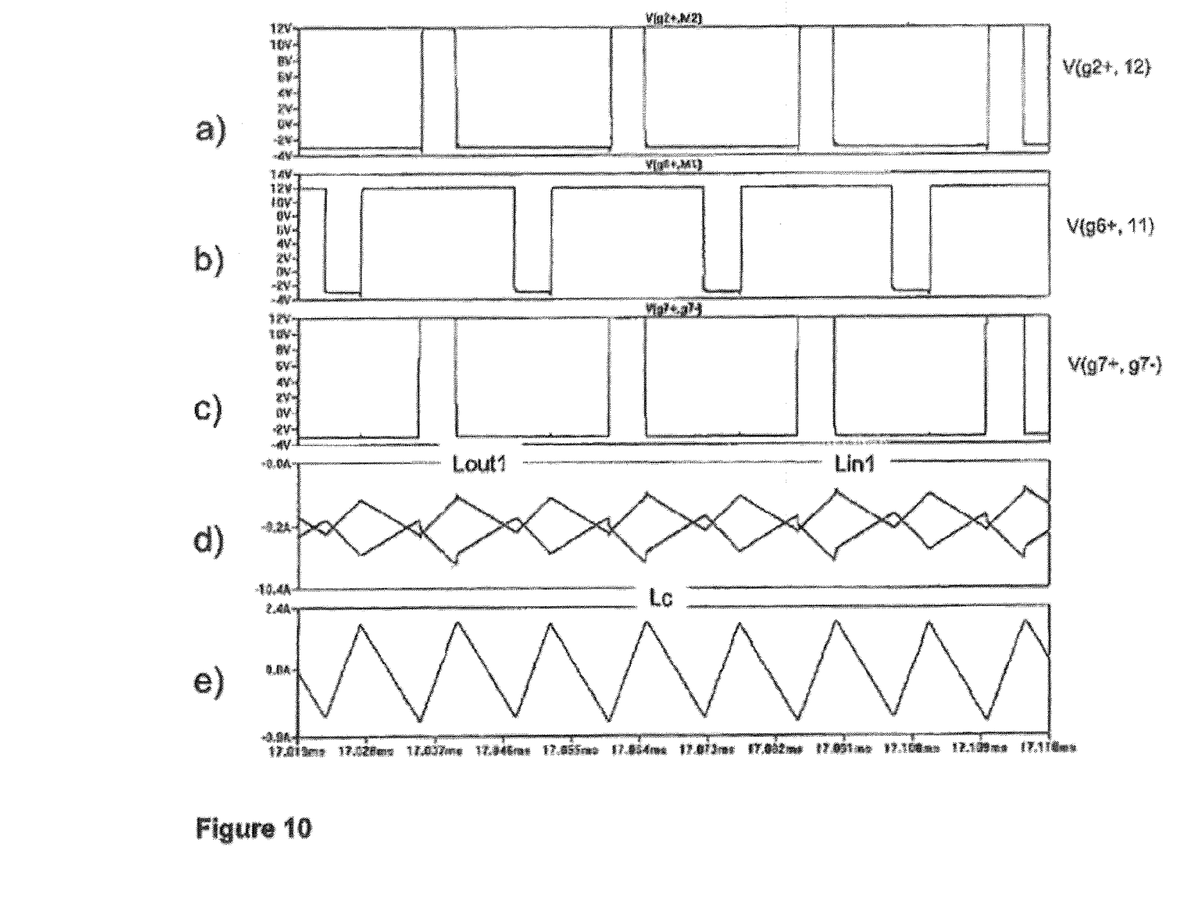

In FIGS. 10a-c the control signals for the switches of FIG. 9 are shown. In FIG. 10d the ripple currents of inductors Lin1 and Lout1 is shown, in FIG. 10e the ripple currents of the common inductor Lc is shown. The ripple currents do exhibit twice the frequency compared with the frequency of the control signals. Hence, it is shown that the ripple current is reduced by synchronization of control signals, so that the inductors see twice the switching ripple.

Figure 11:
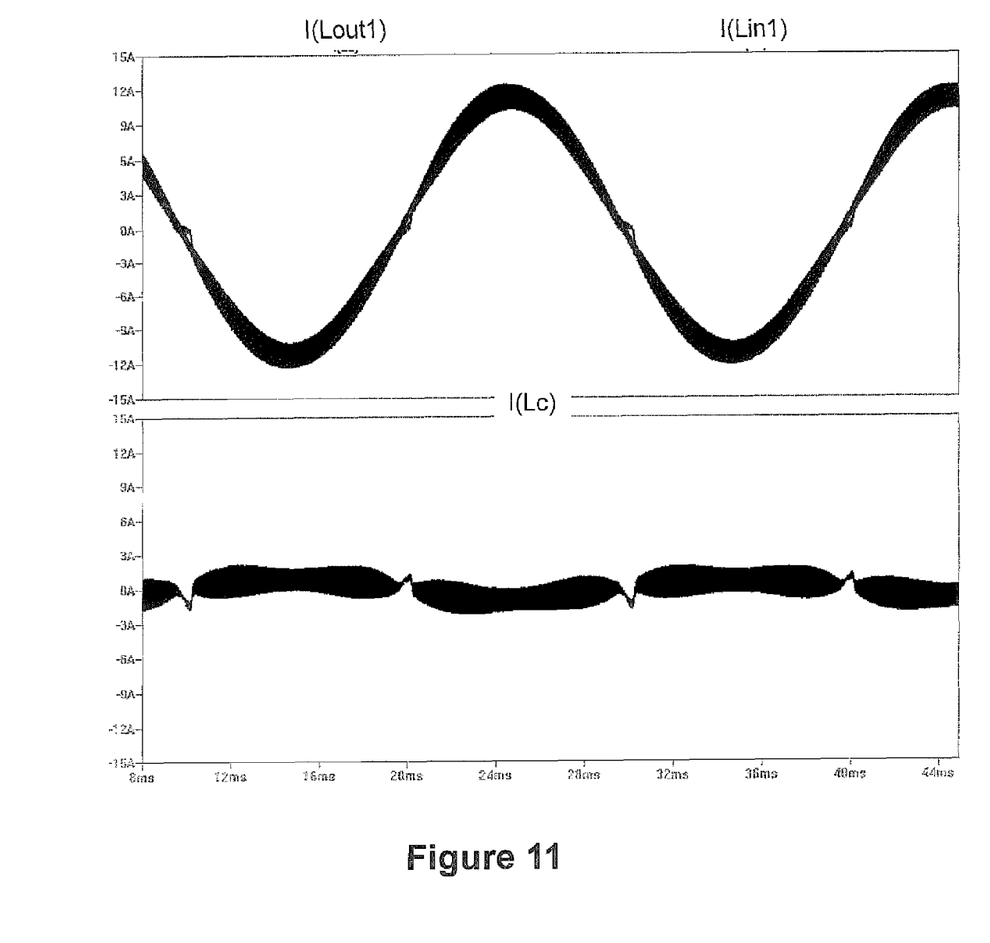
FIG. 11 illustrates the simulated currents through the inductors of the circuit.

In FIG. 11 it is shown that the common inductor Lc is providing cancelation of the line frequency component.

The invention claimed is:

1. An AC-AC converter device, comprising:
   a first and a second AC input terminals;
   a first and a second AC output terminals;
   an input device connected between an input node, a common node, a positive DC terminal and a negative DC terminal, wherein the input node is connected to the first AC input terminal via a first input inductor;
   an output device connected between an output node, the positive DC terminal and the negative DC terminal, wherein the output node is connected to the first AC output terminal via an output inductor;
   a common device connected between the common node, the positive DC terminal and the negative DC terminal, wherein the common node is connected to the second AC input terminal via a common inductor;
   a control device for controlling a plurality of switches of the output device and the common device; and
   a DC device is connected between the positive DC terminal and the negative DC terminal,
   wherein the output device comprises a first and a second output switch,
   wherein the first output switch is connected between the output node and the positive DC terminal and the second output switch is connected between the negative DC terminal and the output node;
   wherein the common device comprises a first and a second common switch,
   wherein the first common switch is connected between the common node and the positive DC terminal, and the second common switch is connected between the negative DC terminal and the common node;
   wherein the second AC input terminal is connected to the second AC output terminal,
   wherein the input device comprises a first and a second diode and a bi-directional switch connected between the input node and the common node,
   wherein the control device is also controlling the bi-directional switch, and wherein the first diode is connected with its anode to the input node and its cathode to the positive DC terminal, the second diode is connected with its anode to the negative DC terminal and its cathode to the input node.

2. The AC-AC converter device according claim 1, wherein the common switches are metal-oxide-semiconductor field-effect transistors (MOSFETs) or insulated-gate bipolar transistors (IGBTs) with an antiparallel diode.

3. The AC-AC converter device according to claim 1, wherein the bidirectional switch comprises a first switch and a plurality of switch diodes.

4. The AC-AC converter device according to claim 3, wherein
the plurality of switch diodes comprises a first switch diode, a second switch diode, a third switch diode, and a fourth switch diode, and
a source terminal of the first switch is connected to an anode of the first switch diode and to an anode of the second switch diode,
a drain terminal of the first switch is connected to a cathode of the third switch diode and to a cathode of the fourth switch diode,
a cathode of the first switch diode and an anode of the third switch diode is connected to a first node,
a cathode of the second switch diode and an anode of the fourth switch diode is connected to the common node, and
a control terminal of the first switch is connected to the control circuit.

5. The AC-AC converter device according to claim 1, wherein the bidirectional switch comprises a first switch and a second switch, each comprising control terminals connected to the control circuit.

6. The AC-AC converter device according to claim 5, wherein a drain terminal of the first switch is connected to the first node, a drain terminal of the second switch is connected to the common node, and a source terminal of the first switch is connected to a source terminal of the second switch.

7. The AC-AC converter device according claim 5, wherein a source terminal of the first switch is connected to the first node, a source terminal of the second switch is connected to the common node, and a drain terminal of the first switch is connected to a drain terminal of the second switch.

8. The AC-AC converter device according to claim 5, wherein the first and second switches of the bidirectional switch are metal-oxide-semiconductor field-effect transistors (MOSFETs).

9. The AC-AC converter device according claim 1, wherein the DC device comprises a DC source, such as a capacitor or a battery.

10. The AC-AC converter device according claim 9, wherein the DC device comprises an additional DC source.

11. The AC-AC converter device according claim 1, wherein a first switch of the bidirectional switch is a metal-oxide-semiconductor field-effect transistor (MOSFET) or an insulated-gate bipolar transistor (IGBT).

* * * * *